United States Patent [19]

Johnson et al.

[11] Patent Number: 4,930,623
[45] Date of Patent: Jun. 5, 1990

[54] CONVEYOR SYSTEM AND INTEGRAL ONE-PIECE EXTENDED GUIDETRACK

[75] Inventors: Thomas A. Johnson, Germantown, Tenn.; Larry V. McDonald, Blytheville, Ark.

[73] Assignee: Industrial Conveyor Co., Inc., Memphis, Tenn.

[21] Appl. No.: 367,951

[22] Filed: Jun. 19, 1989

[51] Int. Cl.⁵ ............................................. B65G 37/00
[52] U.S. Cl. .................................. 198/465.1; 198/841; 198/860.1; 198/861.1; 104/172.1; 104/172.3
[58] Field of Search .................... 198/345, 465.1, 465.2, 198/779, 803.01, 836, 841, 860.2, 861.1, 860.1; 104/172.1, 172.3

[56] References Cited

U.S. PATENT DOCUMENTS

| | | |
|---|---|---|
| 2,731,136 | 1/1956 | Socke . |
| 3,315,778 | 4/1967 | Kendall et al. ...................... 198/345 |
| 3,605,994 | 9/1971 | Parlette . |
| 4,014,428 | 3/1977 | Ossbahr ............................... 198/345 |
| 4,358,010 | 11/1982 | Besch . |
| 4,484,677 | 11/1984 | Berwald . |
| 4,499,991 | 2/1985 | Allen ................................. 198/465.1 |
| 4,511,031 | 4/1985 | Lachonius . |
| 4,545,477 | 10/1985 | Besch . |
| 4,562,921 | 1/1985 | Leemkuil et al. ................. 198/860.1 |
| 4,712,670 | 12/1987 | Burkhardt ............................ 198/779 |
| 4,718,543 | 1/1988 | Leisner ............................... 198/779 |
| 4,836,357 | 6/1989 | Focke ................................... 198/779 |

*Primary Examiner*—Joseph E. Valenza
*Attorney, Agent, or Firm*—Shlesinger & Myers

[57] ABSTRACT

An integral one-piece extended guide track and various conveyor systems incorporating same are disclosed. The guide track includes upper and lower connected web sections, each of which includes full length horizontally extending passageways. The upper web section includes an upwardly extending open channel for slidably supporting the first run of a conveyor chain. The upper lower web section form therebetween a central guideway parallel to the passageways and the channel for supporting the return run of the conveyor chain. A number of mounting slots are provided on the upper and lower web sections. The conveyor systems include single and dual track floor mounted systems, and single track overhead conveyor system. The conveyor systems have turn-tables for changing the direction of travel of the articles supported on the conveyors.

27 Claims, 9 Drawing Sheets

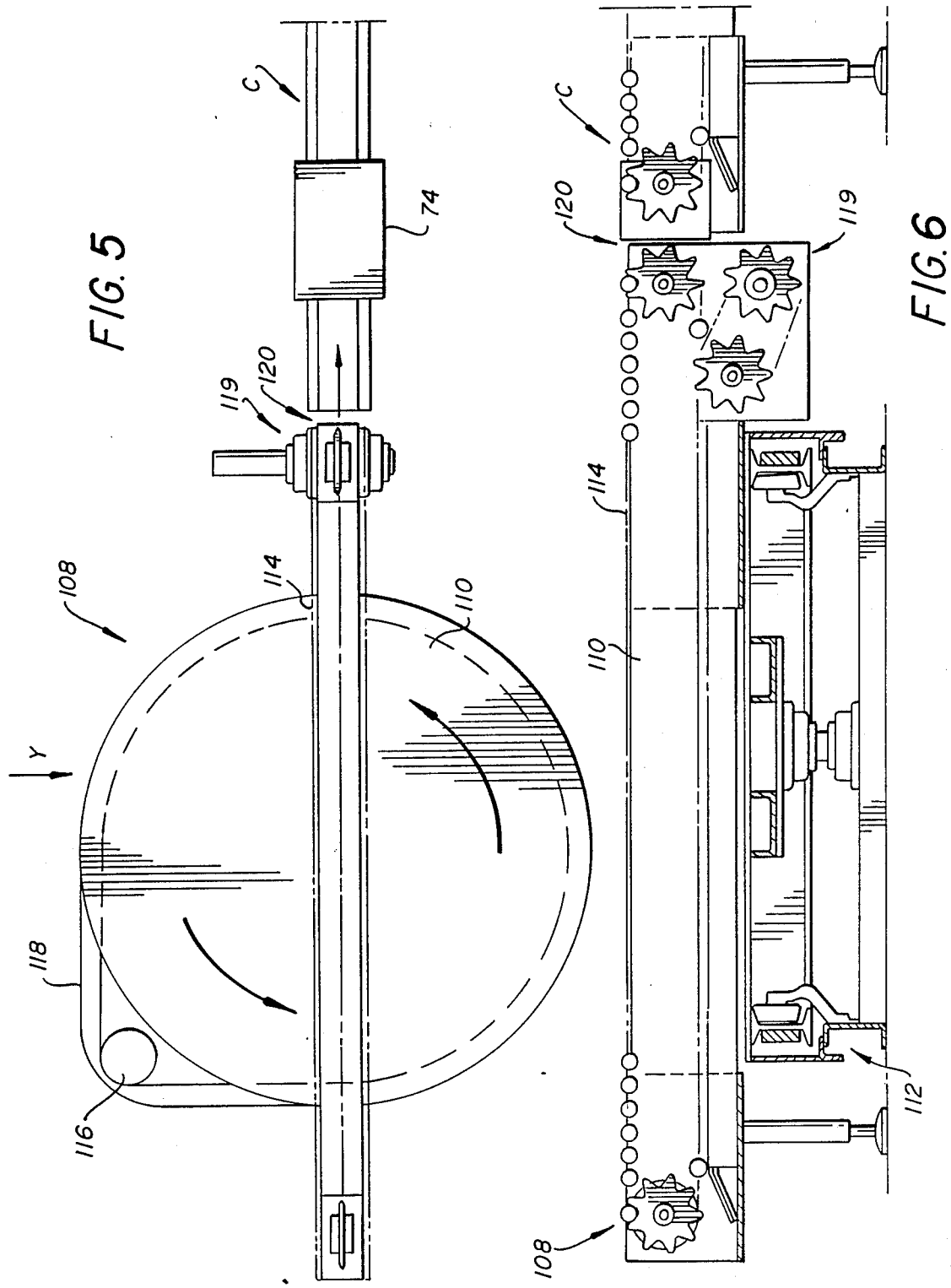

CONVEYOR SYSTEM AND INTEGRAL ONE-PIECE EXTENDED GUIDETRACK

FIELD AND HISTORICAL BACKGROUND OF THE INVENTION

The present invention is directed to conveyor systems, and more particularly to floor and ceiling mounted conveyor systems including an integral, one-piece extended guide track for supporting a conveyor chain.

Various conveyors and guide tracks have been proposed in the art. In particular, mechanical conveyors have been used in the industry for transporting articles from one part of, for example, an industrial plant or warehouse to another. The more commonly used conveyors are the ones which transport goods in cartons, boxes and the like. One typical example is a conveyor belt assembly wherein an endless conveyor belt travels over a bed formed of rollers positioned transversely along the path of travel of the conveyor belt. Other conveyor systems use a conveyor chain that travels along a slot in the conveyor track and supports a weight-bearing member for articles being conveyed along the conveyor.

The conventional conveyor assemblies and guide tracks pose limitations and difficulties in use and operation. For example, they are generally limited to a straight path of travel, and multiple belts and the associated drive mechanisms are required to accommodate a curved path of travel. In addition, guide tracks suffer from the disadvantage that they are limited in there function to support the load carrying chain, and additional mechanisms have to be provided in the vicinity for accommodating associated utilities. This generally leads to a conveyor system which is complicated and difficult to adjust to various necessary mechanisms of the system. The examples of conventional systems are disclosed in U.S. Pat. Nos. 2,731,136; 3,605,994; 4,358,010; 4,484,677; 4,511,031; 4,545,477; and 4,562,921.

Accordingly, there is a need in the conveyor art for a guide track that offers the infinite flexibility in precision alignment and placement of various accessory devices on the conveyor and wherein the conveyor is not limited to a straight path of travel.

OBJECTS AND SUMMARY OF THE INVENTION

The principal object of the present invention is to provide an integral one-piece extended guide track for supporting a non-synchronous load carrying chain that provides integral utility, i.e., air, electrical control wiring, etc., conduit passages running horizontally throughout the length of the guide track, as well as an internal chain return guideway.

It is another object of the present invention to provide an integral, one-piece extended guide track which allows infinite flexibility in the precision placement and alignment of all system peripheral devices, such as supports, cross members, stops, transfers, etc., on the conveyor.

It is yet another object of the present invention to provide an integral, one-piece extended guide track which provides a totally enclosed conveyor chain return system that reduces chain noise.

An additional object of the present invention is to provide an integral, one-piece extended guide track which offers the versatility of the mainframe of a single conveyor system to be completely changed over to another system by simply replacing one of the accessory components with the other and replacing chains or belts, drive and idler sprockets and/or pulleys, allowing for complete manufacturing flexibility and minimizing cost and change over time.

It is another object of the present invention is to provide an integral, one-piece extended guide track which eliminates the need for additional air input manifolds for each air operated device required along a given assembly line, or process requiring ridge air piping under desired a air pressure.

An additional object of the present invention is to provide a floor mounted conveyor system that offers the flexibility of changing the direction of travel of the articles supported on the conveyor.

A further object of the present invention is to provide a ceiling mounted or overhead conveyor system that offers the flexibility of changing the direction of travel of the articles supported from the conveyor.

Still another object of the present invention is to provide a conveyor system which allows the flexibility of varying the widths thereof simply by replacing the cross-members with appropriately sized cross-members.

In summary, the principal objective of the present invention is to provide a conveyor system that is compact, substantially noise free and offers infinite flexibility in the precision placement and alignment of all system accessory devices, such as supports, cross members, etc.

BRIEF DESCRIPTION OF THE DRAWINGS

The above and other objects and advantages and novel features of the present invention will become apparent from the following detailed description of the preferred embodiments of the invention illustrated in the accompanying drawings, wherein:

FIG. 5 is a top plan view of the turn-unit for the single track conveyor system shown in FIG. 4;

FIG. 6 is a partial, enlarged side view of the turn-unit shown in FIG. 5;

FIG. 13 is a partial, enlarged end view of the overhead conveyor shown in FIG. 12;

FIG. 14 is a side view of the turn-unit for the overhead conveyor system shown in FIG. 12;

FIG. 15 is a partial, enlarged top plan view of the turn-unit shown in FIG. 14; and FIG. 16 is an enlarged end view of the turn-unit shown in FIG. 14.

DETAILED DESCRIPTION OF THE INVENTION

Figure 1:
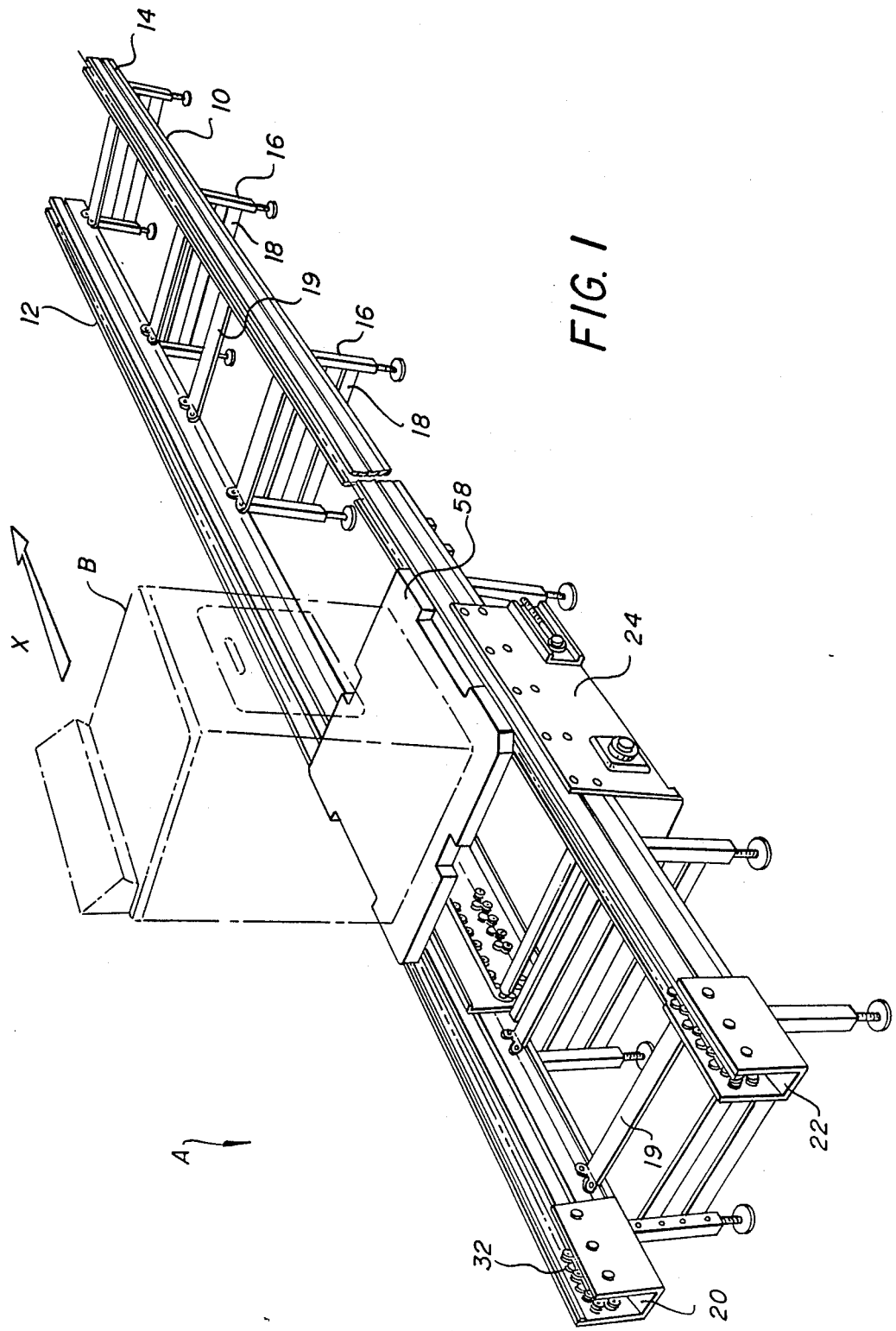
FIG. 1 is a perspective view of a floor mounted conveyor system, showing in broken lines an article being conveyed along the length of the conveyor.
Figure 2:
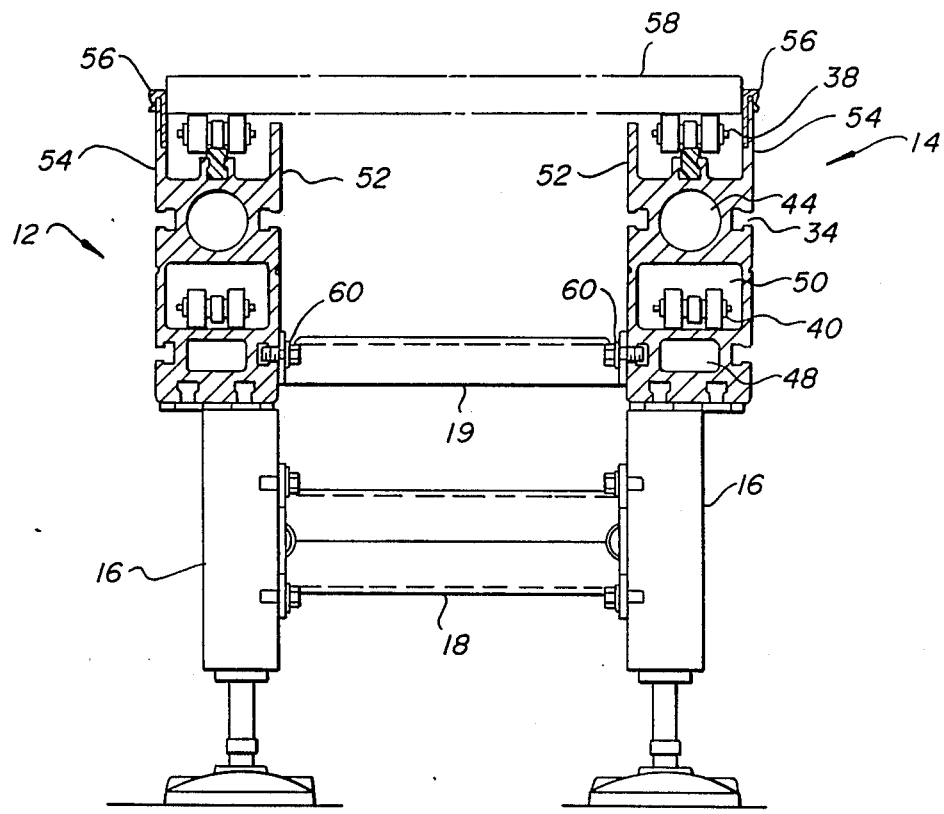
FIG. 2 is a partial, enlarged, vertical cross-sectional view of the conveyor system shown in FIG. 1.

As shown in FIGS. 1 and 2, one embodiment of the conveyor system of the present invention includes a two-track conveyor system A that includes frame 10 generally configured in accordance with the desired path of travel for articles, such as a clothes dryer B, carried on the conveyor. The frame 10 includes generally parallel laterally spaced guide tracks 12 and 14 positioned along the opposite sides of the path of travel, indicated by arrow X. The tracks 12 and 14 are supported at a desired height on support legs 16 positioned at successive intervals along the length of the conveyor A. The frame 10 further includes a number of cross members 18 also positioned at successive intervals along the length of the conveyor A, which extend transversely between and connect legs 16. For additional strength and mechanical integrity of frame 10, braces 19 are provided which generally extend transversely between and are secured to the tracks 12 and 14. The length of the cross-members 18 and braces 19 may be varied to obtain conveyors of varying widths to accommodate different articles. In FIG. 1, numerals 20 and 22 designate end brackets and numeral 24 designates drive unit for the conveyor chain.

Each guide track 12 and 14 is formed of an extruded, integral, extended piece made from a suitable material, such as aluminum, and runs the length of conveyor A. The two tracks 12 and 14 of conveyor system A are identical, as shown in FIG. 2.

Figure 8:
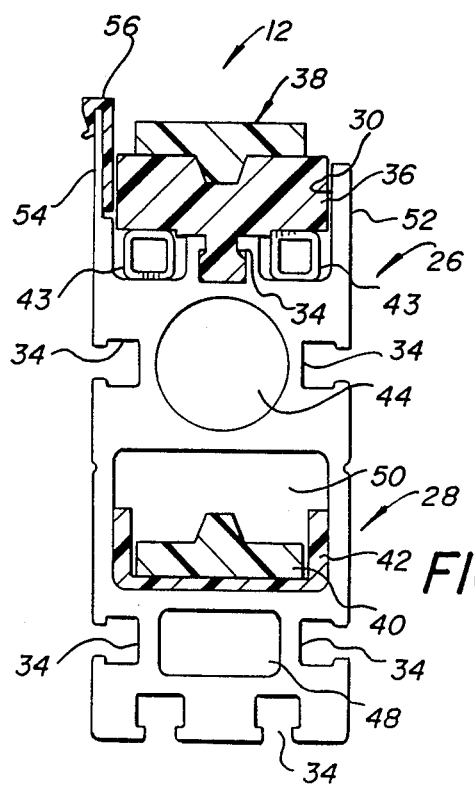
Figure 9:
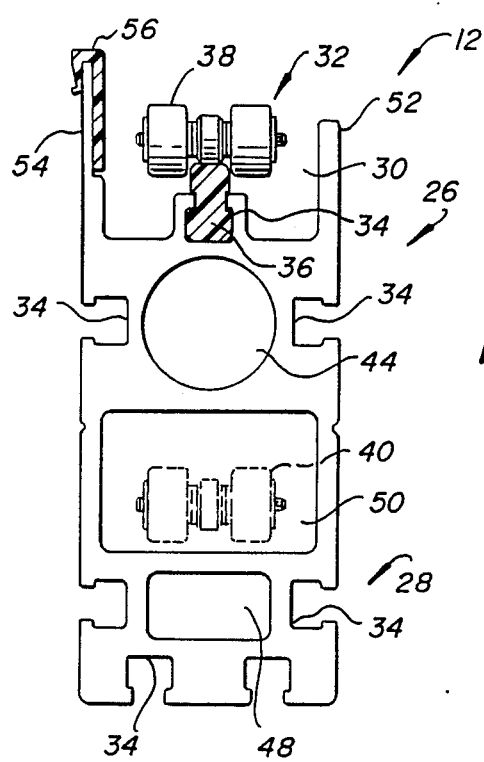

The guide tracks 12 and 14, each includes upper and lower web sections 26 and 28 (only guide track 12 has been described herein with respect to FIG. 9 for clarity). The upper web section 26 includes an upwardly extending open channel 30 for slidably supporting conveyor chain 32. A number of horizontally extending longitudinal, generally T-shaped, mounting slots 34 are disposed about the perimeter of track 12. As shown in FIGS. 7–11, one slot 34 is positioned in open channel 30 for accommodating therein a load bearing member 36 that guides forward run 38 of conveyor chain 32 thereon. As shown in FIGS. 7–11, the shape of load bearing 36 may be varied to accommodate various conveyor chains. The reference numeral 40 in FIG. 7–11, designates return run of the conveyor chain 32.(It should be noted that in FIGS. 7–11 similar parts have been designated with same reference numerals.)

Figure 11:
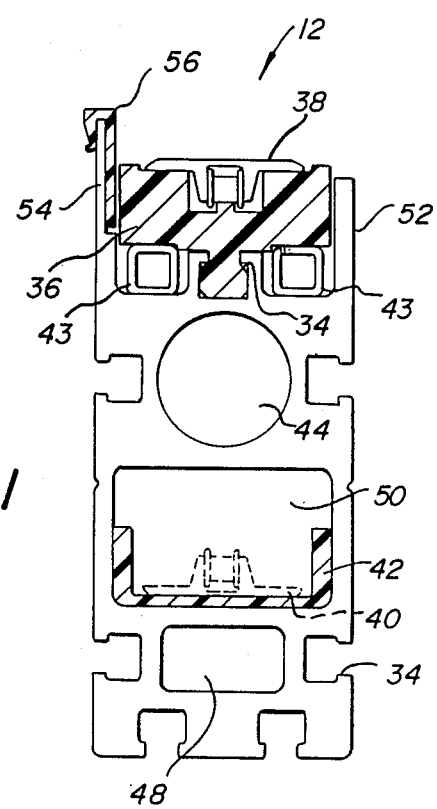
Figure 10:
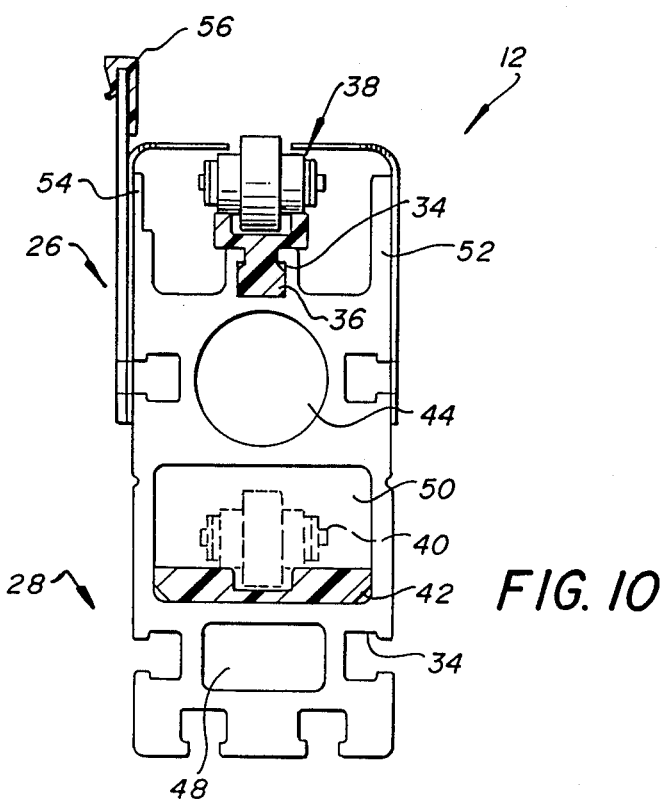

As shown in FIGS. 8, 10 and 11, return run 40 of conveyor chain 32 may preferably be supported on chain guide 42. Additional load bearing members 43 may also be provided, if needed, as shown in FIGS. 8 and 11. The load bearing member 36 and chain guide 42 may be made from a substantially resilient material, such as a high molecular weight polyethylene. For example, the polyethylene may have a molecular weight of about three million by ASTM test DV 020.

Figure 3:
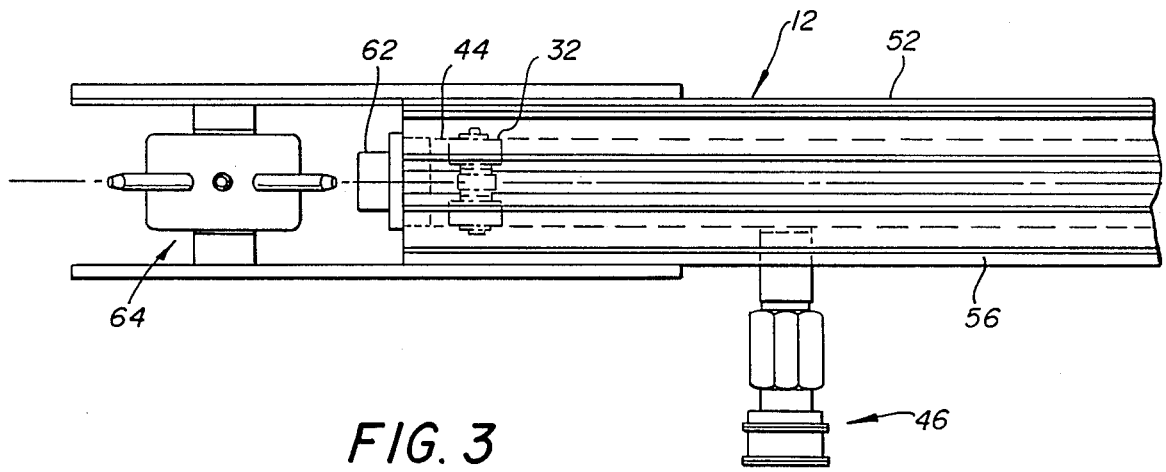
FIG. 3 is a partial, enlarged top plan view of the conveyor system shown in FIG. 1.

The upper web section 26 includes a horizontally extending passageway 44 that is preferably circular in configuration and runs the length of guide track 12 parallel to channel 30. Preferably, passageway 44 has a diameter of about one and eleven sixteenths inches and functions as a compressor air manifold. As shown in FIG. 3, compressor air manifold passageway 44 is connected to a source of air (not shown) via an air feed inlet 46 to provide air with a pressure of up to 90 PSI. The lower web section 28 includes a generally rectangularly shaped passageway 48 which accommodates therein electrical wire cable and the like (not shown). The upper and lower web sections 26 and 28 define therebetween a horizontally extending central guideway 50 which supports return run 40 of conveyor chain 32. The guideway 50 also runs the length of guide track 12 and extends parallel to passageways 44 and 48. Preferably, guideway 50 has a width of about 2 and ¾ inches.

Figure 4:
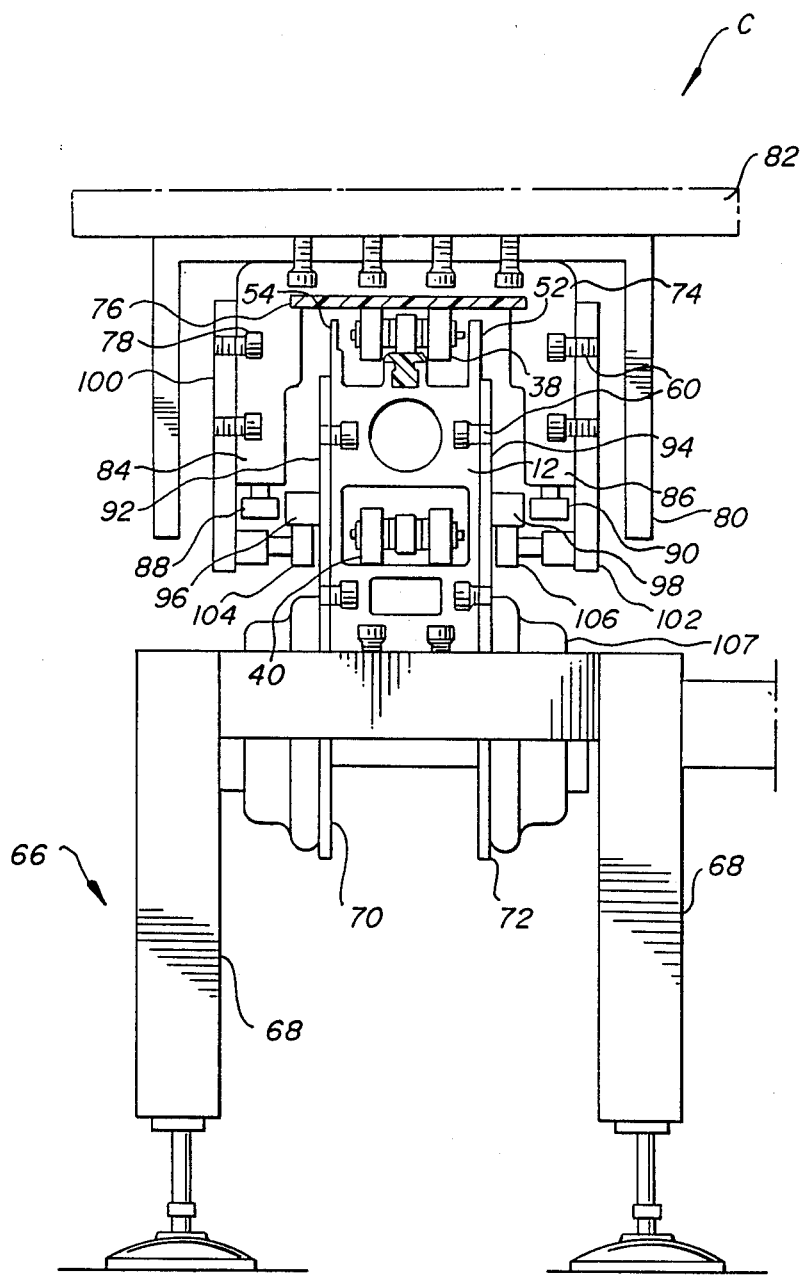
FIG. 4 is an end elevational view of a single track conveyor system of the present invention, showing in broken lines a platform for supporting articles.
Figure 7:
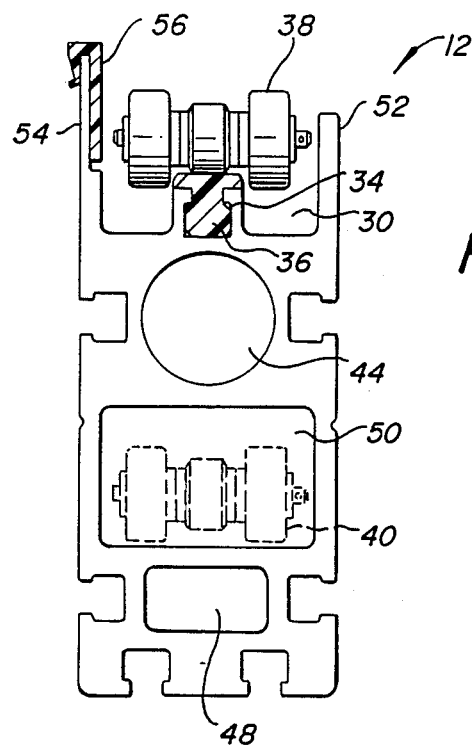
FIGS. 7–11 are end elevational views of the guide track of the invention, showing various chains, and conveyor belts and guides therefor in cross-section.

As shown in FIG. 7–11, channel 30 is defined by upwardly extending lateral guides 52 and 54, the lengths of which may be different, or the same as shown in FIG. 4. A generally U-shaped clip 56 may be mounted over lateral guide 54 which provides low coefficient of side friction for the articles supported on platform 58 (FIG. 2). As shown in FIGS. 2, 4 and 13, slots 34 received heads and shanks of bolts 60 used to attach guide track 12 to other parts of the conveyor system.

In FIG. 3, reference numeral 62 designates a plug to seal air manifold passageway 44 running between conveyors separated by an idler assembly 64. A motor (not shown) is provided within drive unit 24 to cause the rotation of conveyor chain 32. A stop assembly, described below, may be provided at a suitable location in system A to temporarily stop the movement of platform 58 so that article B may be handled.

It should be noted that the guide track 12 described above, is a principal component of the dual track conveyor system (described above), and the single track-floor and overhead mounted-conveyor systems, described below. The guide track of the present invention is therefore, unique, versatile and offers great flexibility in devising various conveyor systems for different uses.

SINGLE TRACK FLOOR MOUNTED CONVEYOR SYSTEM

FIG. 4 shows the floor mounted single track conveyor system C, wherein single guide track 12 is mounted on support frame 66 that includes support legs 68. The guide track 12 is mounted to frame 66 by lateral support plates 70 and 72. A conveyor car 74 with a substantially U-shaped yoke configuration is mounted over guide track 12 and is slidably supported on forward run 38 of conveyor chain 32. A steel plate 76 is disposed between car 74 and conveyor chain 38 to reduce friction and wear thereof. The car 74 also includes generally T-shaped longitudinal mounting slots 78 on the outer perimeter thereof for receiving heads and shanks of bolts 60. A generally U-shaped conveyor 80 is mounted by bolts 60 on car 74 such that when conveyor chain 32 travels along the conveyor system C, car 74 and conveyor 80 move together. A load bearing platform 82 may be mounted over conveyor 80 for conveying various articles thereon. (It should be noted that conveyor 80 and platform 82 move together with car 74.) The side ends 84 and 86 of car 74 have mounted thereon guide wheels 88 and 90, respectively, by suitable mounts conventional in the art. The sides 92 and 94 of guide track 12 have mounted thereon guide members 96 and 98, respectively. Guide members 96 and 98 extend horizontally the length of guide track 12 and are disposed on corresponding sides 92 and 94 so as to be next to corresponding guide wheels 88 and 90 (FIG. 4). Side plates 100 and 102 are mounted on each car 74 and each includes guide wheels 104 and 106, respectively, that extend horizontally below guide members 96 and 98, and are in sliding engagement therewith. Preferably, six guide wheels are mounted on each of side plates 100 and 102 by conventional mounts. It would be apparent to those of ordinary skill in the art that guide wheels 104 and 106, which abut corresponding guides 96 and 98, keep car 74 vertically stable relative to guide track 12, and guide wheels 88 and 90 keep the car 74 properly aligned laterally with respect to guide track 12. In FIG. 4, numeral 107 designates a conventional drive mechanism for driving conveyor chain 32.

FIGS. 5 and 6 show turn-table unit 108 which would generally be located at various intersections of multiple conveyors C for changing the direction of travel of the articles by transferring articles from one conveyor system to another via turn-table unit 108. For example, it may be desirable to convey article from point a to point b in one direction, and then change the direction so as to convey the articles from point b to c in a direction different from the direction of a to b.

As shown in FIG. 6, the turn-table unit 108 includes rotatable platform 110 supported on base frame unit 112. The unit 108 includes a conveyor system 114 similar to single track floor mounted conveyor system C, except that conveyor system 114 is mounted on turn-table unit 108. A motor 116 rotates platform 110 via belt or the like member 118. It should be noted that the entire turn-table unit 108 including conveyor system 114 is capable of being rotated on frame unit 112 relative to conveyor system C, such that articles may be transferred between conveyor system C and conveyor system 114. A suitable clearance 120 would be necessary between conveyor system C and unit 108 in order to allow unit 108 to rotate freely.

Another conveyor system similar to C, would be positioned about another point around turn-table unit 108, indicated by arrow y, for example, so that the articles from conveyor system Y can be transferred to conveyor system 114, and then the turn-table 108 would be rotated such that conveyor system 114, is now in alignment with conveyor system C, so as to transfer the articles from turn-table unit 108 to the conveyor system C. In FIG. 5, numeral 119 designates motor drive mechanism for conveyor system 114.

SINGE TRACK OVERHEAD CONVEYOR SYSTEM

Figure 12:
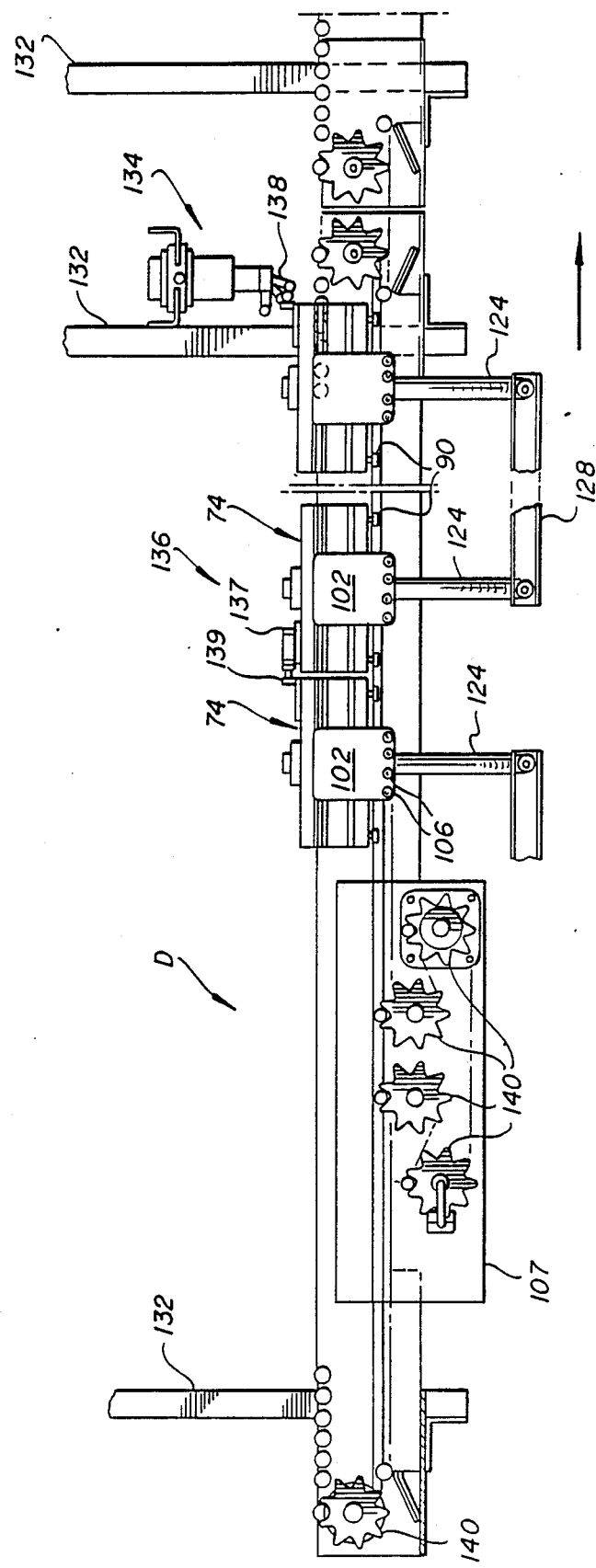
FIG. 12 is a side view of the overhead or ceiling mounted single track conveyor system.

FIGS. 12-16 show a conveyor system D Which is similar to the floor mounted single track conveyor system C, with the exception that conveyor system D is mounted from the ceiling. (It should be noted that in the embodiment shown in FIGS. 12-16, the parts similar to the embodiment shown in FIGS. 4-6 have been designated with the same reference numerals.) As shown in FIG. 13, conveyor system D includes generally the same main elements as conveyor system C, except that conveyor car 74 has a generally flat support plate 122 mounted thereon. A generally hook-shaped article support member 124 extends downwardly from one end of support plate 122. In order to balance car 74, a counterweight 126 is suspended from the other end of the plate 122. As shown in FIG. 12, article support platform 128 or the like may be mounted between two adjacent members 124.

Preferably, the length of each conveyor car 74 is about six inches to twelve feet, and it is capable of supporting a weight of about 120-500 pounds. It should be noted that it is not necessary to connect the two adjacent articles support members 124 in order to convey the articles, and the articles may be directly suspended from loan bearing ends 130 of members 124, as shown in FIG. 13.

As shown in FIGS. 12 and 16, braces 132 support conveyor system D from ceiling E. A stop assembly 134 is mounted on one of the braces 132. The stop 134 may be operated by any conventional means, such as electrical, pneumatic or hydraulic means.

As shown in FIG. 12, a number of conveyor cars 74 travel successively in the conveyor system D, and it is likely that two adjacent cars 74 may collide during the travel. Accordingly, cushion devices 136 are mounted on the cars 74. Each cushion device 136 includes a shock absorbing device 137 mounted on one end of each car 74, and an abutting member 139 mounted on the other end thereof, FIGS. 12 and 14. Therefore, when two adjacent cars 120 come close to one another, member 139 of one car 74 abuts the shock absorbing device 137 of the adjacent car, and any sudden impact is avoided.

The abutting member 139 performs yet another function. As shown in FIG. 12, when member 139 reaches a point where stop device 134 is located, it engages with break member 138 of stop assembly 134, which is pivotable between horizontal and vertical positions. When pivotable member 138 is in the vertical position, it stops the movement of car 74 due to engagement of the abutting member 139 with member 138. In this position, it should be noted that although car 74 is stopped, conveyor chain 32 continues to move along conveyor system D. However, when stop 134 is actuated so as to cause its break member 138 to assume horizontal position, car 74 starts to move again, as member 139 no longer abuts pivotable break member 138. In FIG. 12, sprockets 140 are parts of the drive system 107 for moving the conveyor chain 32 along the conveyor system D.

FIG. 14-16 show a turn unit 142, similar to the turn-table unit 108, for conveyor system D. The turn unit 142 is also suspended, for example, from ceiling E, by support braces 144, FIG. 16. The turn unit 142 includes conveyor system 146 similar to conveyor system D, and is connected to a rotating mechanism 148 by rotating brace unit 150. The rotating mechanism 148 includes power motor 152 or the like that rotates support brace unit 150 via shaft 154, and in turn the conveyor system 146. As shown in FIG. 14, a suitable clearance 156 would be necessary between conveyor system D and turn unit 142 in order to allow unit 142 to rotate freely.

The conveyor system 146, as in the case of the floor mounted conveyor system C, would be in alignment with conveyor system D (FIG. 14) at one point about its range of rotation, and another conveyor system at another point adjacent its limit of rotation, shown by arrow Z (FIG. 15). Accordingly, cars 74 from system Z can be transferred to the conveyor system 146, and then the conveyor system 146 would be rotated so that it is in alignment with the conveyor system D, and the cars 74 may then be transferred to system D.

USE AND OPERATION

As would be apparent to those of ordinary skill in the art, the various conveyor systems disclosed herein can be used to convey various articles from one place to another. The articles can be conveyed by placing them on platform 58 of conveyor system A (FIG. 1), platform 82 of conveyor system C (FIG. 4), or platform 128 of overhead conveyor system D (FIG. 12). Typically, stop assemblies 134 would be provided along the path of a conveyor system at predetermined locations in a work area, where the articles would be handled by an operator, who normally would also have access to various controls (not shown) to control the conveyor system. Accordingly, by manipulating the controls, the operator would be able to convey articles between various location.

If it becomes necessary to change the direction of travel of the articles, the turn units 108 or 142 may be utilized. As discussed above and illustrated, for example, in FIG. 5, turn unit 108 would be placed at intersections of various conveyor systems traveling in difference directions, such as system C and another similar system designated by Y. First, the conveyor system 114 of unit 108 would be rotated so that it is in alignment with conveyor system Y. The cars 74 sliding on conveyor chain of system Y would be transferred to the conveyor chain 32 of system 114. Once this transfer of cars 74 has taken place, the conveyor chain of system 114 would be stopped so that cars remain in position thereon. Next, the turn unit 108 would be rotated until conveyor system 114 is now in alignment with conveyor system C. The conveyor chain of system 114 would be started to run so that the cars 74 thereon begin to move towards system C. As previously, cars 74 would now be transferred from system 114 to system C traveling in a direction different from system Y. It is apparent that by using several systems and several turn units a network of conveyors can be created for conveying articles among several locations lying in different directions.

It should be noted that no additional mechanism is necessary as cars 74 are easily transferred from one system to another due to the fact each conveyor system has its own closed loop conveyor chain. Therefore, when a car reaches the end of a conveyor system where forward run of the conveyor chain turns around to travel in the opposite direction, the car is inevitably transferred to the conveyor chain of adjacent conveyor system traveling in the same direction as the forward run of the previous system. In essence, the car is forced from the previous conveyor chain to the adjacent conveyor chain due to the inertia of motion.

While this invention has been described as having the preferred designs, it is understood that it is capable of further modifications, uses and/or adaptions of the invention and following in general the principles of the invention and including such departures from the present disclosure as come within known or customary practice in the art to which the invention pertains, and as may be applied to essential features hereinbefore set forth, and fall within the scope of invention or the limits of the claims appended hereto.

What is claimed is:

1. An integral one-piece extended guide track for supporting an endless conveyor means having first and second runs, including:
   (a) first and second web sections having left and right sides, top and bottom;
   (b) said first web section including an upwardly extending open channel for slidably supporting the first run of the conveyor means;
   (c) said second web section positioned below said first web section and connected thereto;
   (d) said first and second web sections each including a full length horizontally extending separately enclosed passageway parallel to said channel;
   (e) said first and second web sections forming therebetween a full length central separately enclosed guideway parallel to said passageway and said channel;
   (f) said central guideway having means for supporting the second run of the conveyor means; and
   (g) said first and second web sections each including mounting means extending the length of the guide track.

2. The guide track of claim 1, wherein:
   (a) said mounting means comprises horizontally extending longitudinal slots.

3. The guide track of claim 1, wherein:
   (a) each of said left and right sides of said first and second web sections includes a slot; and
   (b) said slots being parallel to each other.

4. The guide track of claim 1, wherein:
   (a) said bottom of said second web section includes a slot.

5. The guide track of claim 1, wherein:
   (a) said top of said first web section includes a slot.

6. The guide track of claim 1, wherein:
   (a) said passageway in said first web section houses therein air pressure means.

7. The guide track of claim 1, wherein:
   (a) said passageway in said second web section houses therein electrical wiring means.

8. The guide track of claim 1, and including:
   (a) a pair of upwardly extending flanges for defining left and right boundaries of said open channel.

9. The guide track of claim 8, wherein:
   (a) one of said pair of flanges has a length greater than the length of the other of said pair of flanges.

10. The guide track of claim 8, wherein:
    (a) said pair of flanges are substantially equal in length.

11. A conveyor system including an endless conveyor means having first and second runs for conveying articles, comprising:
    (a) a guide track for supporting the first and second runs of the endless conveyor means;
    (b) means for supporting said guide track on a support surface;
    (c) yoke means slidable supported on the endless conveyor means;
    (d) a first conveyor support means mounted on said yoke means for supporting thereon various articles;
    (e) means for aligning said yoke means relative to said guide track; and
    (f) said guide track including:
       i. first and second web sections having left and right sides, top and bottom;
       ii. said first web section including an upwardly extending open channel for slidably supporting the first run of the endless conveyor means;
       iii. said second web section positioned below said first web section and connected thereto;
       iv. said first and second web sections each including a full length horizontally extending separately enclosed passageway parallel to said channel;
       v. said first and second web sections forming therebetween a full length central separately enclosed guideway parallel to said passageway and said channel;
       vi. said central guideway having means for supporting the second run of the endless conveyor means; and vii. said first and second web sections each including mounting means extending the length of said guide track.

12. The conveyor system of claim 11, wherein:
(a) said yoke means is generally U-shaped.

13. The conveyor system of claim 12, wherein:
(a) said aligning means includes a horizontally extending guide means disposed on left and right sides of said guide track; and
(b) said aligning means includes roller means disposed on said yoke means and cooperating with said guide means.

14. The conveyor system of claim 11, and including:
(a) means for changing the direction of travel of the articles supported on said first conveyor means.

15. The conveyor system of claim 14, wherein:
(a) said direction changing means includes rotatable turntable means having a second conveyor support means cooperating with said first conveyor support means.

16. The conveyor system of claim 15, wherein:
(a) said turn-table means includes drive means for causing the rotation thereof.

17. The conveyor system of claim 15, and including:
(a) a third conveyor support means cooperating with said turn-table means; and
(b) whereby the articles are transferred from said first conveyor support means to said second conveyor support means, and from said second conveyor support means to said third conveyor support means.

18. A conveyor system adapted to be suspended from a support surface and including an endless conveyor means having first and second runs, comprising:
(a) a guide track for supporting the first and second runs of the endless conveyor means;
(b) means for suspending said guide track from the support surface;
(c) yoke means slidably supported on the endless conveyor means;
(d) a first conveyor support means mounted on said yoke means;
(e) said first conveyor support means including means for supporting various articles;
(f) means for aligning said yoke means relative to said track; and
(g) said guide track including:
(i) first and second web sections having left and right sides, top and bottom;
ii. said first web section including an upwardly extending open channel for slidably supporting the first run of the endless conveyor means;
iii. said second web section positioned below said first web section and connected thereto;
iv. said first and second web sections each including a full length horizontally extending separately enclosed passageway parallel to said channel;
v. said first and second web sections forming therebetween a full length central separately enclosed guideway parallel to said passageway and said channel;
vi. said central guideway having means for supporting the second run of the endless conveyor means; and
vii. said first and second web sections each including mounting means extending the length of said guide track.

19. The conveyor system of claim 18, wherein:
(a) said yoke means is generally U-shaped.

20. The conveyor system of claim 19, wherein:
(a) said aligning means includes a horizontally extending guide means disposed on left and right sides of said guide track; and
(b) said aligning means includes roller means disposed on said yoke means and cooperating with said guide means.

21. The conveyor system of claim 18, and including:
(a) means for changing the direction of travel of the articles supported on said first conveyor means.

22. The conveyor system of claim 21, wherein:
(a) said direction changing means includes rotatable turntable means having a second conveyor support means cooperating with said first conveyor support means.

23. The conveyor system of claim 22, wherein:
(a) said turn-table means includes drive means for causing the rotation thereof.

24. The conveyor system of claim 22, and including:
(a) a third conveyor support means cooperating with said turn-table means; and
(b) whereby the articles are transferred from said first conveyor support means to said second conveyor support means, and from said second conveyor support means to said third conveyor support means.

25. The conveyor system of claim 18, wherein:
(a) said article supporting means includes a plurality of horizontally spaced car means suspended therefrom.

26. The conveyor system of claim 25, and including:
(a) stop means in operating engagement with said first conveyor support means for temporarily halting running of the conveyor system at predetermined locations along the length thereof.

27. The conveyor system of claim 26, wherein:
(a) said stop means is pneumatically operated.

* * * * *